United States Patent
Kim

(10) Patent No.: US 9,156,366 B2
(45) Date of Patent: Oct. 13, 2015

(54) APPARATUS AND METHOD FOR MANAGING ENERGY OF ELECTRIC VEHICLE

(71) Applicant: Electronics and Telecommunications Research Institute, Daejeon-si (KR)

(72) Inventor: Ki-Seok Kim, Daegu-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 187 days.

(21) Appl. No.: 13/940,908

(22) Filed: Jul. 12, 2013

(65) Prior Publication Data

US 2014/0203775 A1    Jul. 24, 2014

(30) Foreign Application Priority Data

Jan. 22, 2013    (KR) .................. 10-2013-0007106

(51) Int. Cl.
*H02J 7/00* (2006.01)
*B60L 11/18* (2006.01)
*B60L 3/12* (2006.01)

(52) U.S. Cl.
CPC ............... *B60L 11/1844* (2013.01); *B60L 3/12* (2013.01); *B60L 11/184* (2013.01); *B60L 11/1816* (2013.01); *B60L 11/1842* (2013.01); (Continued)

(58) Field of Classification Search
CPC ..... H02J 7/0052; H02J 7/0054; B60L 11/182; B60L 11/1809; B60L 11/1861; B60L 2240/545; B60L 2240/547; B60L 2240/549; B60L 11/1816; B60L 3/0046
USPC .................................................. 320/104, 137
See application file for complete search history.

(56) References Cited

U.S. PATENT DOCUMENTS 6,230,496 B1    5/2001  Hofmann et al.
7,571,492 B2 *  8/2009  Hubert ............................ 726/36
(Continued)

FOREIGN PATENT DOCUMENTS

KR     10-0279433      3/2001
KR     10-0818811      4/2008
(Continued)

*Primary Examiner* — Nghia Doan
(74) *Attorney, Agent, or Firm* — Kile Park Reed & Houtteman PLLC

(57) ABSTRACT

A system and method for managing energy of an electric vehicle are provided to calculate a necessary amount of energy based on battery characteristics and a user's schedule, and control charging and discharging of the electric vehicle using power information provided by a smart grid. The system includes a cloud server configured to collect a schedule from a user and store and generate the user's schedule information, an energy management device configured to calculate necessary energy based on the received schedule information of the user, set charging information based on power network state information received from a power supplier and the calculated necessary energy, generate a charging request signal based on the set charging information, and store electric energy, and a charging unit configured to transfer the electric energy to the energy management device based on the received charging request signal.

12 Claims, 4 Drawing Sheets

(52) U.S. Cl.
CPC ......... *B60L 11/1846* (2013.01); *B60L 11/1848*
(2013.01); *B60L 2240/68* (2013.01); *B60L
2240/70* (2013.01); *B60L 2240/80* (2013.01);
*B60L2250/14* (2013.01); *B60L 2260/44*
(2013.01); *Y02E 60/721* (2013.01); *Y02T
10/7005* (2013.01); *Y02T 10/7291* (2013.01);
*Y02T 90/121* (2013.01); *Y02T 90/128*
(2013.01); *Y02T 90/14* (2013.01); *Y02T 90/16*
(2013.01); *Y02T 90/161* (2013.01); *Y02T
90/163* (2013.01); *Y02T 90/168* (2013.01);
*Y02T 90/169* (2013.01); *Y04S 10/126*
(2013.01); *Y04S 30/12* (2013.01); *Y04S 30/14*
(2013.01)

(56) References Cited

U.S. PATENT DOCUMENTS

2004/0155661 A1* 8/2004 Field et al. ............ 324/426
2010/0017249 A1* 1/2010 Fincham et al. ............ 705/8
2011/0282513 A1 11/2011 Son et al.

FOREIGN PATENT DOCUMENTS

KR  10-2011-0125542   11/2011
KR  10-1119364        3/2012

* cited by examiner

APPARATUS AND METHOD FOR MANAGING ENERGY OF ELECTRIC VEHICLE

CROSS-REFERENCE TO RELATED APPLICATION

This application claims the benefit under 35 U.S.C. §119(a) of a Korean Patent Application No. 10-2013-0007106, filed on Jan. 22, 2013, the entire disclosure of which is incorporated herein by reference for all purposes.

BACKGROUND

1. Field

The following description relates to an apparatus and method for managing energy of an electric vehicle, and more particularly, to technology for managing an energy storage device of an electric vehicle using a cloud-based smart grid.

2. Description of the Related Art

Because problems such as environmental problems and the depletion of energy resources have recently begun to arise, next-generation vehicles, such as electric vehicles and plug-in hybrid vehicles, for solving these problems are receiving more attention. Expensive large-capacity batteries are mounted to drive the above-described next-generation vehicles. In many batteries including a lithium ion-based battery recently widely used, stability, performance, life, and the like significantly differ according to a management method. In particular, because the life and performance of the battery exhibit a significant difference according to a charging environment, a charging cycle, a charging amount at a time, and a charging scheme, there is a need for an optimum charging management method of guaranteeing a given battery life while maintaining the basic performance of the battery. With the recent extension of construction of an intelligent power network such as a smart grid, a time band-specific differentiated fee is applied and charging at an optimum fee is an important issue from the point of view of a user.

According to the intelligent power network construction, charging is attempted for a time in which the user may charge the battery for a minimum fee. Batteries such as lithium-ion polymer batteries recently widely used have the limited number of times of charging/fully discharging the battery. Overcharging and fully discharging are also factors that reduce battery life. An overload may occur in a power network when a large number of users simultaneously concentrate in a time band in which the charging fee is low and side effects may be caused due to an increase in a range of fluctuation of power use. Accordingly, it is important to charge/discharge the battery by appropriately setting a necessary amount of energy.

SUMMARY

The following description relates to an apparatus and method for calculating a necessary amount of energy based on battery characteristics and a user's schedule so as to guarantee the performance and life of a battery, and charge the battery with only the necessary amount of energy according to the schedule so that a temporary overload does not occur in a power network, and for controlling battery charging and discharging of an electric vehicle using power information provided by a smart grid.

In one general aspect, there is provided a system for managing energy of an electric vehicle, including: a cloud server configured to collect a schedule from a user, and store and provide the user's schedule information; an energy management device configured to calculate necessary energy based on the received schedule information of the user, set charging information based on power network state information received from a power supplier and the calculated necessary energy, generate a charging request signal based on the set charging information, and store electric energy; and a charging unit configured to transfer the electric energy to the energy management device based on the received charging request signal. The user's schedule information may include place information and time information about the user's schedule. The power network state information may include electricity sale price information and power network load information. Also, the energy management device may set the charging information by further considering battery characteristics and capacity. The charging information may include at least one of charging time information, charging cycle information, and charging amount information. The energy management device sets the charging information so that the battery is charged with electricity for a time in which electricity sale price is lowest based on the received power network state information. Thereby, it is possible to charge an energy storage unit including the battery of the electric vehicle at lowest price.

In another general aspect, there is provided a method of managing energy of an electric vehicle, including: receiving a user's schedule information and power network state information; calculating necessary energy based on the received schedule information of the user; setting charging information based on the calculated necessary energy and the received power network state information; and charging a battery with electric energy based on the set charging information.

When the received schedule of the user is a periodic schedule, the charging information is set using preset necessary energy. On the other hand, when the received schedule of the user is an aperiodic schedule, it is determined whether there is preset charging information. When the preset charging information is determined to be present, a charging cycle of the charging information is reset.

Other features and aspects will be apparent from the following detailed description, the drawings, and the claims.

Figure 1:
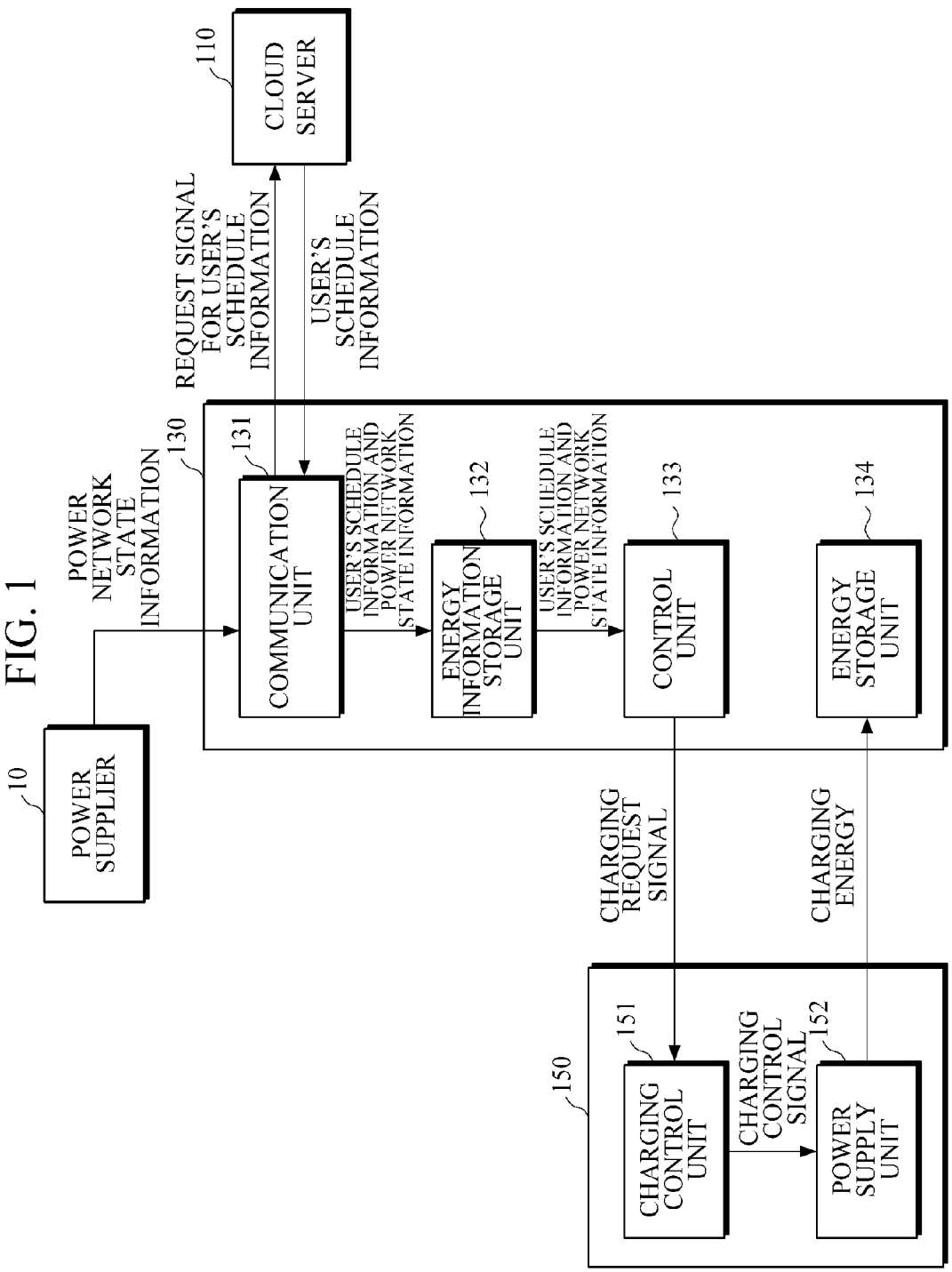
FIG. 1 is a diagram illustrating an example of an electric vehicle energy management system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating an example of an electric vehicle energy management system.

Referring to FIG. 1, the electric vehicle energy management system according to the example of the present invention includes a cloud server 110, an energy management device 130, and a charging unit 150.

The cloud server 110 stores a user's schedule information received from the user or an owner of a vehicle. The user's schedule information includes schedule contents, place information, and time information about the user's schedule, and may include season information, weekday information, and daily pattern information when necessary. The user's schedule information includes information about a schedule to be iterated in a given cycle such as attendance/leaving-related information as well as information about a sporadic schedule directly set by the user.

The cloud server 110 may directly receive the user's schedule information from the user. As a method in which the user directly inputs the user's schedule information, the user's schedule information may be transferred to the cloud server 110 using a smart device such as a smart phone or a tablet personal computer (PC), or a general PC. Upon receiving an information request signal from the energy management device 130 or periodically, the cloud server 110 transmits the user's schedule information to the energy management device 130.

The energy management device 130 includes a communication unit 131, an energy information storage unit 132, a control unit 133, and an energy storage unit 134.

The communication unit 131 transfers an information request signal to the cloud server 110, and receives the user's schedule information from the cloud server 110. In addition, the communication unit 131 receives power network state information from a power supplier 10 with an intelligent power network. The power supplier 10 with the intelligent power network serves as a power supplier constituted of a smart grid system. Power network state information provided by the power supplier 10 with the intelligent power network may include power network load information, electricity purchase/sale price information, and current power use state information.

The communication unit 131 may include mobile communication based on $3^{rd}$ Generation Partnership Project (3GPP), Long-Term Evolution (LTE), and Wireless Broadband (WiBro), wireless communication based on Wireless-Fidelity (Wi-Fi) and Bluetooth, wired communication, and the like. The communication unit 131 is connected to the cloud server 110 and the power supplier 10 with the intelligent power network using all connectable communication methods such as various communication methods described above, and receives the user's schedule information and power network state information. The received schedule information of the user and the received power network state information are transferred to the energy information storage unit 132.

The energy information storage unit 132 stores the user's schedule information received from the cloud server 110 through the communication unit 131 and the power network state information received from the power supplier 10. The energy information storage unit 132 accumulates and stores the user's schedule information continuously received from the user. The user's behavior, daily pattern, and action radius are inferable from the accumulated schedule information of the user. For example, it is possible to recognize attendance/leaving information based on daily iterated schedule information from the accumulated schedule information of the user, and to recognize that the attendance/leaving schedule is constant and iterated except for a special case even when no attendance/leaving schedule information is separately input. In addition, the energy information storage unit 132 stores vehicle information including vehicle characteristic information and battery characteristic information. The energy information storage unit 132 transfers the stored schedule information of the user, the stored power network state information, and the stored vehicle information to the control unit 133.

The control unit 133 sets necessary energy based on the schedule information of the user received from the communication unit 131. The received schedule information of the user includes schedule contents, place information, and time information about the user's schedule, and may include season information, weekday information, and daily pattern information when necessary. First, the control unit 133 sets energy in consideration of a distance according to a location based on the place information in the schedule included in the received schedule information of the user, and sets energy in consideration of current vehicle characteristics and the battery characteristics of the energy storage unit 134 in an energy setting process.

In addition, the control unit 133 may set necessary energy by further considering time information, season information, traffic information, and weekday information included in the user's schedule information. Energy consumption by the vehicle may differ according to traffic conditions and weather as well as a vehicle movement distance, vehicle characteristics, and battery characteristics. The control unit 133 estimates road conditions according to the time information, the season information, and the weekday information included in the user's schedule information, and may set necessary energy using traffic condition information when necessary. For example, it is possible to estimate traffic congestion according to a time and place based on the location information, the time information, and the weekday information included in the user's schedule information and set the necessary energy in consideration of the estimated traffic congestion. Also, it is possible to set the necessary energy in consideration of a regional weather forecast according to the location information and the time information.

The control unit 133 may differently set a charging cycle in consideration of the battery characteristics upon setting the necessary energy based on the received schedule information of the user. When the number of schedules of the user is large or when a movement distance is long, it is possible to calculate the necessary energy by setting a short period. When the number of schedules is small, it is possible to calculate the necessary energy by setting a long period. Alternatively, it is possible to calculate the necessary energy by setting a predetermined period. For example, the necessary energy is constantly calculated weekly by presetting a period of a week within a period in which the battery may be maintained at an optimum condition considering the battery characteristics, and the necessary energy is calculated in units of three days when the number of schedules is large, or the necessary energy is calculated in units of two weeks when the number of schedules is small.

The control unit 133 sets charging information for charging the battery with necessary energy based on the received power network state information, the set necessary energy information, and the vehicle information. The charging information includes charging time information, charging amount information, and a charging cycle for charging the battery of the energy storage unit 134, and may further include information about a charging place and the like.

The control unit 133 sets charging information including a charging cycle and a charging amount in consideration of battery type and capacity of the energy storage unit 134 included in the vehicle information and the set necessary energy information. The necessary energy is electric energy necessary to drive the vehicle according to the user's schedule. The battery of the energy storage unit 134 has a limited capacity, or maximum capacity is limited. Also, a capacity necessary to maintain optimum performance is presented. For example, a lithium-ion battery is most efficient at a charging ratio of 20% to 80%. Accordingly, the battery may not be fully charged at a time according to an amount of necessary energy. The received power network state information includes current power network load state information and power (electricity) sale price information. The control unit 133 may set optimum charging information in consideration of power network load state information and power (electricity) sale price information included in the received power network state information. The optimum charging information represents a time and cycle in which the battery can be charged with a necessary charging amount at the lowest price. Also, when the user's schedule included in the received schedule information of the user is added or deleted or when schedule contents are changed, the control unit 133 resets the charging information.

The control unit 133 generates a charging control signal for charging the energy storage unit 134 based on the set charging information, and transfers the generated charging control signal to a charging control unit 151 of the charging unit 150. Although necessary energy is calculated in a state in which the control unit 133 is located in the energy management device 130 of the electric vehicle in the embodiment of FIG. 1, this is only exemplary. The control unit 133 may operate inside the cloud server 110 or in the form of a separate server and calculate necessary energy based on the received schedule information of the user or may be implemented to set charging information and transfer the set charging information to the electric vehicle.

The energy storage unit 134 stores charging energy transferred from a power supply unit 152 of the charging unit 150. The energy storage unit 134 includes a battery capable of being charged with electric energy. When the battery is charged with the received charging energy, the charging energy may be used to drive a vehicle. The energy storage unit operates in charging and discharging modes according to control of the control unit.

The charging unit 150 includes the charging control unit 151 and the power supply unit 152.

The charging control unit 151 generates a charging control signal for charging the energy storage unit 134 of the energy management device 130 based on a charging request signal received from the control unit 133 of the energy management device 130, and transfers the charging control signal to the power supply unit 152.

The power supply unit 152 receiving the charging control signal from the charging control unit 151 transfers charging energy set according to a set time and cycle to the energy storage unit 134 of the energy management device 130 based on the received charging control signal.

Figure 2A:
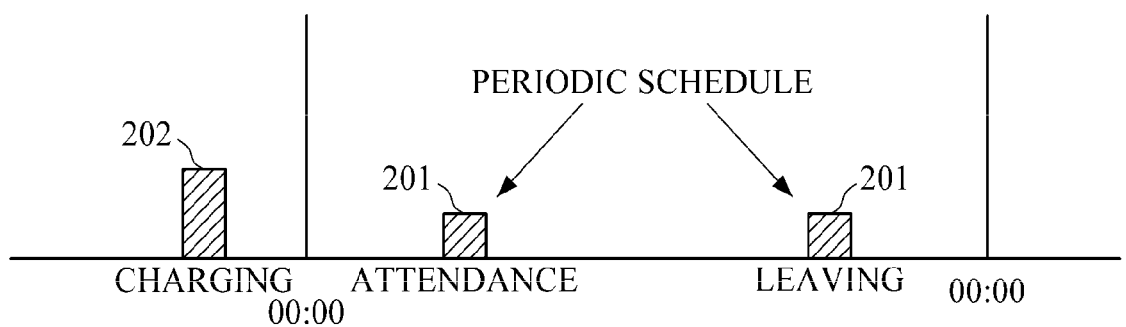
FIG. 2A is a diagram illustrating an example of a charging cycle setting of a periodic schedule of the electric vehicle energy management system.
Figure 2B:
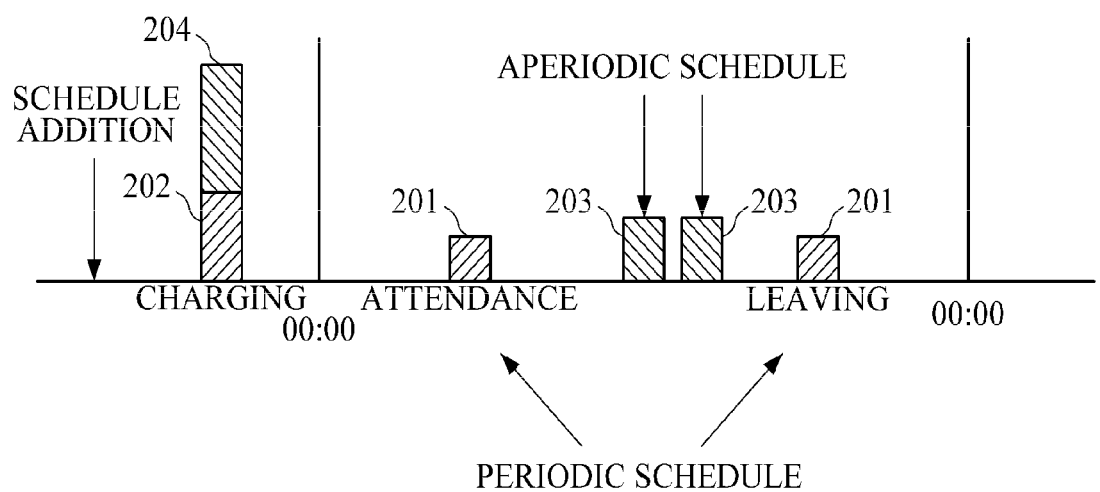
FIG. 2B is a diagram illustrating an example of a charging cycle setting of an aperiodic schedule of the electric vehicle energy management system.

FIG. 2A is a diagram illustrating an example of a charging cycle setting of a periodic schedule of the electric vehicle energy management system, and FIG. 2B is a diagram illustrating an example of a charging cycle setting of an aperiodic schedule of the electric vehicle energy management system.

Referring to FIGS. 2A and 2B, the charging cycle setting of the electric vehicle energy management system according to the example of the present invention first sets necessary energy in units of specific periods according to normal schedule information. The schedule information includes information about one or more places and time information.

FIG. 2A includes an iterated periodic schedule 201. The periodic schedule 201 represents attendance and leaving as a schedule iterated in a uniform cycle. Because of constant movement of the same distance in the same cycle in the periodic schedule 201, the necessary energy may be set to be constant. When the necessary energy according to the periodic schedule is set, the necessary energy is set according to a distance between a departure location and an arrival location for the attendance time and the leaving time. In a process of setting necessary energy for attendance and leaving schedules, the necessary energy may be set in consideration of a time and date corresponding to the user's schedule and battery characteristics of a vehicle. For example, when the user's schedule overlaps a weekday attendance/leaving time, more energy may be necessary because traffic congestion is estimated. In this case, energy necessary for the user's schedule may be set to be relatively high.

Also, the charging cycle is set in consideration of the set necessary energy, the battery characteristics of the vehicle, and the power network state information. The charging cycle and the charging time are set by considering the performance and life of the battery through the setting of the necessary energy and the charging cycle through the above-described process and a time band in which the battery may be charged at a low price. For example, when daily necessary energy is 2 kWh, the battery may be charged daily in units of 2 kWh or charged with energy of 6 kWh once for every three days. This charging cycle has a correlation with the battery characteristics, and may be set according to season, a change in a supply-demand state of a power network, and a change in weather. According to the set charging cycle, the battery is charged with necessary energy 202 of the periodic schedule.

FIG. 2B includes an aperiodic schedule 203. The aperiodic schedule is a sporadic schedule, not a schedule such as attendance/leaving which is constantly iterated in the same cycle and the same movement distance. When the aperiodic schedule 203 of the user is generated, a schedule is corrected with respect to the aperiodic schedule 203 of the user and the corrected schedule is stored in the cloud server. The cloud server transfers the stored aperiodic schedule of the user to the electric vehicle. The control unit of the electric vehicle sets necessary energy according to a departure location and an arrival location of an added aperiodic schedule using location information of an added schedule according to the added aperiodic schedule. For example, when the aperiodic schedule is added during the periodic schedule, necessary energy according to the aperiodic schedule is calculated, and existing necessary energy is reset. Schedules affected by energy according to the added schedule are corrected, necessary energy including both the periodic schedule 201 and the aperiodic schedule 203 is set, and charging information is set. Based on the set charging information, the battery is charged with the necessary energy 202 for the periodic schedule and necessary energy 204 for the aperiodic schedule.

If necessary energy until the next charging time according to the added schedule is insufficient, the charging information is reset by correcting the charging time.

When energy is calculated using schedule information in FIGS. 2A and 2B, the schedule information may include location information, and a distance according to a location may be independently calculated using a navigation system or the like. After the energy is set or calculated by providing location information of a vehicle to the server, information about energy may be transferred to the control unit.

Figure 3:
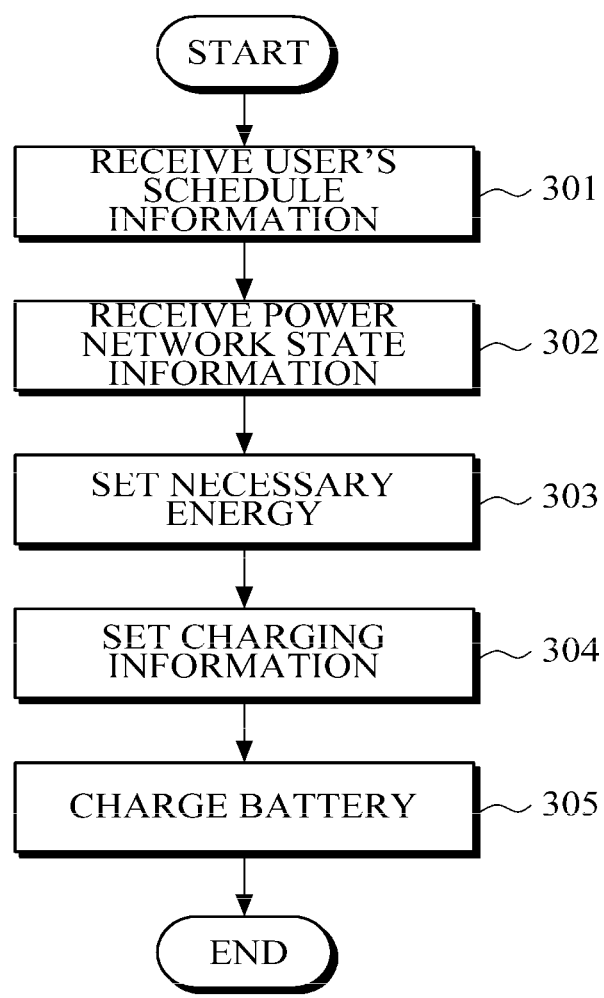
FIG. 3 is a flowchart illustrating an example of an electric vehicle energy management method.

FIG. 3 is a flowchart illustrating an example of an electric vehicle energy management method.

Referring to FIG. 3, in the electric vehicle energy management method according to the example of the present invention, first, the user's schedule information is received from the user (301). The user transfers his/her own schedule information to the cloud server, and the user's schedule information transferred to the cloud server is transferred to the energy management device of the electric vehicle. The user's schedule information includes time information including a date and a time about the user's schedule and location information including an arrival location, a departure location, and movement about the user's schedule. Also, the user's schedule information may include season information, weekday information, traffic state information, and daily pattern information when necessary.

Then, power network state information is received from the power supplier (302). The received power network state information includes current power network load state information and power (electricity) sale price information. Optimum charging information may be set in consideration of the power network load state information and power (electricity) sale price information included in the received power network state information and the battery characteristics. The optimum charging information represents a time and cycle in which the battery may be charged with a necessary charging amount at the lowest price. Also, the optimum charging information represents an optimum charging amount which is set to be greater than or equal to a minimum charging amount in which the battery may be charged at the lowest price from the point of view of the user.

Next, necessary energy is set based on the user's schedule included in the received schedule information of the user (303). The received schedule information of the user includes schedule contents, place information, and time information about the user's schedule, and may include season information, weekday information, traffic condition information, and daily pattern information when necessary. A process of charging the battery with energy differs according to whether a schedule included in the received schedule information of the user is periodic or aperiodic. First, energy is set in consideration of a distance according to a location based on place information about the schedule included in the received schedule information of the user. In the energy setting process, the energy is set in consideration of current vehicle characteristics and battery characteristics of the energy storage unit 134.

Then, the charging information is set (304). The charging information for charging the battery with necessary energy based on the received power network state information, the set necessary energy information, and the vehicle information is set. The charging information includes charging time information, charging amount information, and a charging cycle for charging the battery of the electric vehicle, and further includes information about a charging place and the like. Charging information including a charging cycle and a charging amount is set in consideration of battery type and capacity and set necessary energy information included in the vehicle information. The necessary energy is electric energy necessary to drive a vehicle according to the user's schedule.

Next, the battery is charged based on the set charging information (305). The charging information includes information about a charging time, a charging amount, and a charging cycle considering the battery of the electric vehicle, the necessary energy, and the power network state. Accordingly, it is possible to charge the battery with a necessary amount of electric energy for a time in which the price of the electric energy is lowest and thus effectively use the electric energy at a low price.

In accordance with the apparatus and method according to the examples of the present invention, it is possible to reduce negative effects on battery life because a battery is charged in consideration of battery characteristics, calculate a necessary amount of energy based on a user's schedule in cooperation with a cloud system, and charge the battery of a vehicle with the effect of distributing a load in a power network at low charging cost.

The present invention can be implemented as computer readable codes in a computer readable record medium. The computer readable record medium includes all types of record media in which computer readable data is stored. Examples of the computer readable record medium include a ROM, a RAM, a CD-ROM, a magnetic tape, a floppy disk, and an optical data storage. Further, the record medium may be implemented in the form of a carrier wave such as Internet transmission. In addition, the computer readable record medium may be distributed to computer systems over a network, in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for managing energy of an electric vehicle, the apparatus comprising:
   a communication unit configured to receive a user's schedule information from the user, and receive power network state information from a power supplier;
   a control unit configured to set charging information based on the received schedule information of the user, battery information, and the received power network state information, and generate and transfer a charging request signal for charging a battery based on the charging information, wherein when the schedule information comprises a periodic schedule, the control unit is configured to set the charging information to include a charging amount necessary for the periodic schedule, and when the scheduling information comprises an aperiodic schedule and the periodic schedule, the control unit is configured to reset the charging information to include the charging amount necessary for the periodic schedule and a charging amount necessary for the aperiodic schedule; and
   an energy storage unit configured to store electric energy received according to the charging information.

2. The apparatus of claim 1, wherein the user's schedule information comprises place information and time information about the user's schedule.

3. The apparatus of claim 1, wherein the power network state information comprises power network load information and electricity sale price information.

4. The apparatus of claim 1, wherein the control unit sets the charging information by further considering battery characteristics and capacity comprised in the energy storage unit.

5. The apparatus of claim 1, wherein the charging information comprises at least one of charging time information, charging cycle information, charging amount information, and charging place information.

6. The apparatus of claim 1, wherein the control unit sets the charging information so that the battery is charged with electricity for a time in which electricity sale price is lowest based on the received power network state information.

7. A method of managing energy of an electric vehicle, the method comprising:

receiving a user's schedule information and power network state information;

calculating necessary energy based on the received schedule information of the user, wherein when the schedule information comprises a periodic schedule, the control unit is configured to set the charging information to include a charging, amount necessary for the periodic schedule, and when the scheduling information comprises an aperiodic schedule and the periodic schedule, the control unit is configured to reset the charging information to include the charging amount necessary for the periodic schedule and a charging amount necessary for the aperiodic schedule;

setting charging information based on the calculated necessary energy, battery characteristics, and the power network state information; and charging a battery with electric energy according to the set charging information.

8. The method of claim 7, wherein the user's schedule information comprises place information and time information about the user's schedule.

9. The method of claim 7, wherein the power network state information comprises power network load information and electricity sale price information.

10. The method of claim 7, wherein the charging information is set by further considering battery characteristics and capacity.

11. The method of claim 7, wherein the charging information comprises at least one of charging time information, charging cycle information, charging amount information, and charging place information.

12. The method of claim 11, wherein the charging information is set so that the battery is charged with electricity for a time in which electricity sale price is lowest based on the received power network state information.

* * * * *